May 24, 1949. R. W. TATE 2,470,878
HOOK
Filed March 19, 1945
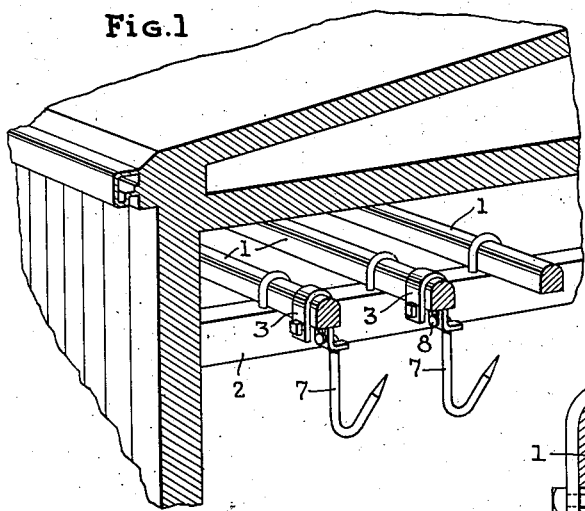
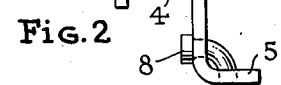
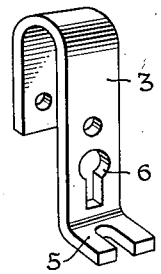
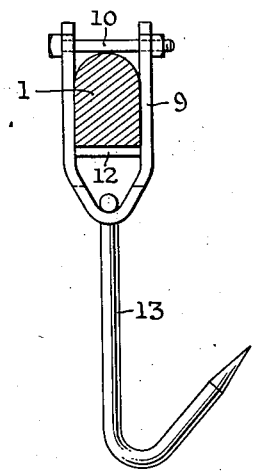
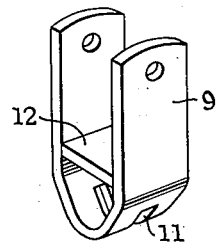
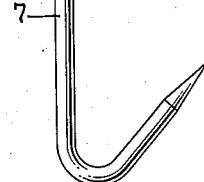
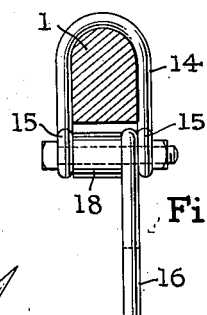
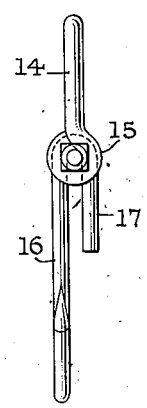
INVENTOR.
Robert W. Tate
BY
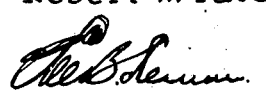
Attorney.

Patented May 24, 1949

2,470,878

UNITED STATES PATENT OFFICE 2,470,878

HOOK

Robert W. Tate, Chicago, Ill.

Application March 19, 1945, Serial No. 583,534

5 Claims. (Cl. 248—215)

1

This invention relates to certain improvements in meat hooks by means of which meat carcasses and cuts of meat, including such heavy cuts as hind and fore quarters of beef, or dressed hogs, are suspended from overhead rails or beams in refrigerated or other storage spaces or compartments. The invention has particular usefulness for supporting such heavy cuts of meat in refrigerated railway vehicles, but it is also useful in all installations, where there is the problem of supporting meat cuts during either transportation or storage.

Meat hooks of the kind here contemplated are quite large and heavy articles, and are of such size and weight that their accidental displacement from their support, as when a heavy cut of meat is being removed from the hook, might very easily cause a serious injury to the individual engaged in the operation of removing the meat from the hook, e. g., if he were struck by the hook as it fell from its support. Also, the size and weight of these hooks is such that their monetary (junk) value, when separated from their support makes them attractive loot, particularly when used on railway vehicles and the empty cars stand on sidings or in freight yards. Consequently, this invention was conceived in the effort to provide a meat hook which can be removed from its support when necessary for cleaning or the like, but which is connected with its support so that its removal therefrom is not the result of mere accident, but only by manipulation which is not too apparent to one unfamiliar with the method of its disconnection. With these objectives in mind, the details of the invention will be understood from the following description taken in conjunction with the illustrations of the accompanying drawings, which form a part of this disclosure, and in which, Figure 1 is a perspective view of one form of my invention for use in a refrigerated railways vehicle, showing a partial section of such a vehicle with one form of my improved meat hook suspended from an overhead rail or beam within the lading space of the vehicle.

Fig. 2 shows, in side elevation, the form of hook and its supporting member, that is shown in Fig. 1.

Fig. 3 is a perspective view of the hook supporting element of Fig. 2.

Figs. 4, 5 and 6 show the details of a modified form of my invention and its support. In this embodiment the hook is supported for swinging movement transversely of the overhead supporting rail or beam.

2

Figs. 7 and 8 show another form or embodiment of my improved meat hook and its support. Here, the support is designed to permit the hook to swing in the vertical plane of the overhead supporting rails.

In Fig. 1 which shows, in partial section, a refrigerated type of railway vehicle, the meat-supporting rails 1 extend longitudinally of the vehicle and are supported on transverse beams or transoms 2, the latter being generally supported jointly by the car side walls and by the roof framing of the vehicle. The meat hooks constituting my invention are supported by the rails 1 and can be positioned therealong, with any desired spacing, which is best suited to the efficient use of the available lading space.

The hook illustrated in Fig. 1, is shown in detail, in Figs. 2 and 3. The hook support consists of a clevis-like element 3 which encircles the rail 1, and is secured thereto against displacement by a bolt 4. By loosening the nut on the bolt 4, the element 3 can be moved along the rail 1 to any desired position, and by removal of the bolt, as will be apparent, the clevis element 3 can be entirely removed from one rail for use on another rail. At one side, the element 3 has a depending portion with an outwardly bent and forked terminal portion 5. The depending portion of element 3, below the securing bolt 4, is slotted, in key-hole fashion. This slot 6, shown best in Fig. 3, is in vertical alignment with the slot of the forked end 5.

The hook 7 of Fig. 2 is of conventional design at its lower, meat-engaging end. Adjacent its upper end, it is bent at a right angle, and the end of the angled portion is upset or otherwise formed with an enlargement 8. The latter is made of size that will permit it to pass through the larger part of the key-hole slot in the member 3, but it is too large to pass the narrower part of that slot. To connect the hook with the supporting member 3, the end 8 is inserted through the upper end of the slot 6 and then the hook is lowered until its angled portion engages the bottom of the slot and the shank of the hook is engaged within the forked end 5 of the member 3. When so engaged and supported, the hook 7 is rigidly held in its operative position, and it cannot easily be accidentally displaced or disconnected from its support. Its removal requires that it be raised vertically and then, while maintained at the proper elevated position, moved outwardly to cause the enlarged end 8 to pass through the upper enlarged end of the slot 6. Thus, mere vertical displacement of the hook, as e. g. when a heavy cut of meat is being removed, will not cause the hook to become disconnected from its support, because its vertical displacement is limited by the slot 6.

The embodiment of my invention as illustrated in Figs. 4, 5 and 6 comprises a swinging hook and support therefor, by which the hook is detachably engaged with its support and is suspended to swing in a direction transverse to the line of the supporting rail 1. Here, again, the hook support is a clevis-like element 9 which is adjustably clamped to the rail 1 by a bolt 10 or equivalent securing means. The lower end of the member 9 is formed as a loop or stirrup, and is provided with an open slot 11. A plate 12 connects the arms of the clevis member 9 and is positioned to contact the under side of the rail 1 when the member 9 is secured thereto. The hook member 13 of this assembly is of T-shape at its upper end, with the top part of the T disposed normal to the plane of the hook and its shank. To engage the hook with its support, the T-head of the shank is inserted through the slot in the lower loop of the member 9, and then the hook is rotated through an angle of 90° which results in bringing the hook end and supporting loop into the relative positions as shown in Fig. 4. The converging side walls of the loop or stirrup serve to retain the hook-end in the position shown in Fig. 4, and to resist its turning to a position in which its upper end can pass through the slot in the bottom of the stirrup. Vertical displacement of the hook, as in removing a cut of meat therefrom, is limited by the plate 12.

The embodiment of my invention, as shown in Figs. 7 and 8, provides another form of hook which is supported to swing from its support in the vertical plane of the supporting rail 1, rather than transversely thereof, as in the Fig. 4 construction. Here, the hook supporting member 14 is a clevis-like device which encircles the rail 1 and has its lower ends bent to form eyes through which is threaded a clamping bolt, as in the Fig. 2 construction. The hook element 16 is formed with its shank portion bent into inverted U-shape, with its bent end 17 extending parallel to and for a substantial distance along (beside) the hook shank. From the showing of Fig. 8, it will be seen that the loop portions of the shank lie in a plane which is normal to the plane of the hook proper. To assemble the hook with its support, the hook must be held in a substantially horizontal position and then moved so that the bolt of the clevis member 14 will enter the open loop of the shank. When the bolt contacts the closed end of the loop, the hook can be swung to its operative pendant position, as shown in Fig. 7. Preferably a spacer sleeve 18 is used on the clevis bolt to prevent swinging of the hook, save in the vertical plane of the supporting rail 1. While this hook can be removed (disconnected) from its support, when it is swung into a horizontal position, there is little chance that the hook would accidentally be moved into that position as a meat cut is being placed upon or removed from the hook. Vertical displacement of the hook relative to its support is prevented by its looped end coming into contact with the bottom of rail 1.

The foregoing is given by way of illustration, and it is understood that my invention includes all modifications and embodiments which fall within the scope of the appended claims.

I claim:

1. In means for suspending cuts of meat or the like in a refrigerated or other meat-storage compartment, the combination comprising: a clevis-like member adapted to be supported on an overhead beam or rail within the compartment, said member having side arms adapted to engage the opposite lateral sides of the rail and portions depending from said arms below the bottom of the rail; and a hook having the end of its shank connected to said member within and between said portions for detachment by manual manipulation of said hook, the shank of said hook having a transversely extending integral part for suspending said hook on said member for swinging movement in a single plane, and for preventing accidental disconnection of said hook from said member by vertical displacement in the act of removing a cut of meat from said hook.

2. In means for suspending cuts of meat or the like in a refrigerated or other meat-storage compartment, the combination comprising: a clevis-like member adapted to be supported on an overhead rail or beam within the compartment, said member having side arms adapted to engage the opposite lateral sides of the beam and depend therebelow; a bolt passing through and connecting the depending ends of said arms for clamping said member on the beam; and a hook having a loop on the end of its shank engaged with said bolt between said arms for detachably suspending said hook for swinging movement in a single plane, the looped end of said shank extending a substantial distance parallel to the main shank of said hook and the vertical clearance between the bight of said loop and the underside of the beam being substantially less than the length of said looped end, whereby said hook can be detached from said bolt only by first swinging said hook into a position where said main shank is substantially parallel to the beam and then translating said hook substantially parallel to the beam, thus precluding accidental disconnection of said hook by vertical displacement in the act of removing a cut of meat therefrom.

3. In means for suspending cuts of meat or the like in a refrigerated or other meat-storage compartment, the combination comprising: a clevis-like member adapted to be supported on an overhead rail or beam within the compartment, said member having side arms adapted to engage the opposite lateral sides of the beam and a depending loop portion integrally connecting said side arms below the beam, said portion having an elongated slot through the bight thereof disposed transversely of the beam; and a hook having a T-shaped shank and engaged with the bight of said loop portion through said slot for detachably suspending said hook for swinging movement in a single plane, whereby said hook can be detached from said portion only by displacing said hook upwardly, and rotating the shank thereof approximatey 90° in order to withdraw said T-shaped end through said slot, thus precluding accidental disconnection of said hook from said member by vertical displacement in the act of removing a cut of meat from said hook.

4. The structure defined in claim 3 in which the loop portion of the clevis-like member is closed by a plate which connects the opposite branches of the loop above the slot and serves to limit vertical displacement of the hook when suspended from said portion.

5. In means for suspending cuts of meat or the like in a refrigerated or other meat-storage compartment, the combination comprising: a clevis-like member adapted to be supported on an overhead beam or rail within the compartment, said member having side arms adapted to engage the opposite lateral sides of the rail and a portion depending from one of said arms below the bottom of the rail and terminating in a forked end which latter is bent outwardly at substantially a right angle to said portion, said portion having a keyhole slot therethrough above and in substantially vertical alignment with the cleft in said forked end; and a hook having a substantially right angle bend near the end of its shank and an enlargement on said shank end which is received and retained within said keyhole slot for detachably suspending said hook from said member with said shank received in said cleft to prevent swinging of said hook.

ROBERT W. TATE.

REFERENCES CITED

The following references are of record in the file of this patent:

UNITED STATES PATENTS

| Number | Name | Date |
|---|---|---|
| 426,778 | Dalton | Apr. 29, 1890 |
| 737,851 | Landers | Sept. 1, 1903 |
| 1,072,871 | Richards | Sept. 9, 1913 |
| 1,350,632 | Albrecht | Aug. 24, 1920 |
| 1,360,103 | Fasitenhammer | Nov. 23, 1920 |

FOREIGN PATENTS

| Number | Country | Date |
|---|---|---|
| 210,277 | Great Britain | Jan. 31, 1924 |
| 7,078 | Great Britain | June 17, 1891 |
| 160,667 | Great Britain | Mar. 31, 1921 |